Patented Jan. 10, 1950

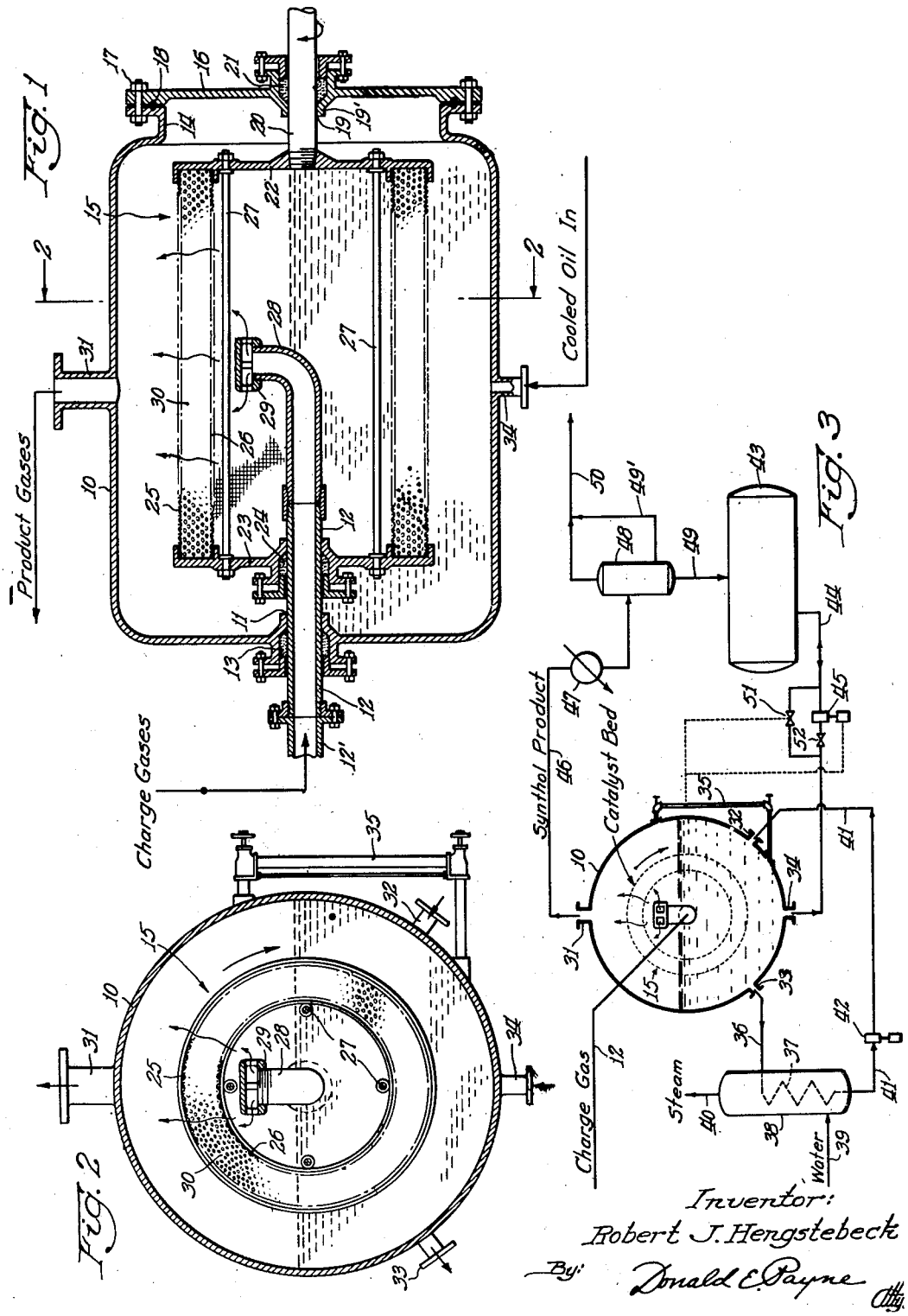

2,493,917

UNITED STATES PATENT OFFICE 2,493,917

CATALYTIC CONVERSION

Robert J. Hengstebeck, Chicago, Ill., assignor to Standard Oil Company, Chicago, Ill., a corporation of Indiana Application November 20, 1944, Serial No. 564,348

13 Claims. (Cl. 260—449.6)

This invention relates to catalytic conversion and it pertains more particularly to an improved method and means for controlling temperature and space velocity in exothermic reactions which may be carried out in the presence of a cooling liquid, an example of such process being the well-known reduction of carbon monoxide with hydrogen to form hydrocarbons and/or oxygen-containing compounds.

In most catalytic reactions carried out at any given pressure the most important and fundamental variables are temperature and space velocity. In highly exothermic reactions such for example as hydrocarbon synthesis from carbon monoxide and hydrogen by the so-called "Fischer" or "Synthol" reaction, temperature control is perhaps the outstanding problem. For each barrel of liquid hydrocarbons synthesized the heat of reaction which is liberated amounts to approximately 2,000,000 B. t. u. It is not only necessary to remove this vast amount of heat but it is also necessary that the conversion temperature in the synthesis zone be maintained within relatively narrow limits, any undue temperature rise or hot spots tending to cause the reaction to "run away," to produce methane instead of liquid hydrocarbons, and to ruin the activity of the catalyst. Previous commercial systems have employed a cumbersome and expensive arrangement of finned tubes throughout the catalyst bed so that each catalyst particle is within a centimeter or less of a cooling surface; the cost of such systems is enormous. An object of my invention is to obtain a better, more effective and more efficient temperature control than has previously been possible and to obtain such control in an extremely simple and inexpensive manner.

It has been proposed (Alien Property Custodian application Serial 373,942, published May 25, 1943, now abandoned, and U. S. Letters Patents 2,161,974, 2,287,092, 2,309,034, etc.) to effect temperature control in Synthol reactions by directly contacting a vaporizable liquid such as water or a product fraction so that liberated heat will be absorbed in supplying heat of vaporization to the cooling liquid. The use of such direct cooling by introducing a liquid product fraction or water into a fixed bed reactor is objectionable because of the distribution problems, tendencies toward by-passing, short circuiting and flooding, difficulties of maintaining desired space velocities and numerous other difficulties. An object of my invention is to provide an improved method and means of employing direct cooling which will eliminate all objections to this type of operation and which will actually provide a means for controlling space velocity instead of interfering with such control. A further object is to provide an improved method and means of continuously reconditioning catalyst and removing waxy deposits therefrom. A further object is to provide an improved conversion system which is inexpensive and easy to fabricate and repair. Other objects will be apparent as the detailed description of the invention proceeds.

In practicing my invention I employ a rotating catalyst bed partially immersed in a cooling liquid, the charge gases being introduced at one side of the bed and withdrawn at the other side thereof and the bed being rotated at such velocity as to keep the catalyst at substantially uniform temperature. Where the heat capacity of the bed is sufficiently great a relatively non-vaporizable liquid may be used for effecting the cooling. Where the heat capacity of the bed is not great enough to absorb liberated heat of reaction as sensible heat without exceeding safe limits, the catalyst may be kept wet with a vaporizable liquid during that portion of the time when it is in contact with the reaction gas mixture. The space velocity may be simply and effectively controlled by simply raising and lowering the level of the liquid in which the rotating bed is partially immersed. The speed of rotation may be controlled to insure reimmersion of the catalyst before it gets too hot or to insure the presence of vaporizable liquid on the catalyst from the time it emerges from the liquid layer until the time it is again immersed therein. The heat imparted to the liquid from the catalyst bed may be utilized for generating steam or for other useful purposes. Any vaporized liquid which leaves the conversion chamber with product gases may be recovered therefrom and reintroduced as a liquid into the lower part of the conversion chamber.

The invention will be more clearly understood from the following detailed description of an example read in conjunction with the accompanying drawings which form a part of this specification and in which:

Figure 1 is a vertical section of the reaction chamber itself taken along the axis of rotation;

Figure 2 is a transverse vertical section of said reaction chamber taken along the lines 2—2 of Figure 1; and Figure 3 is a schematic flow diagram of my improved Synthol conversion system.

Referring to Figure 1, a cylindrical pressure vessel 10 is provided at one end with a central opening 11 for charging gas inlet line 12, a gastight pressure seal between the inlet pipe and the pressure vessel being afforded by a packing gland 13. The other end of the pressure vessel is provided with an opening 14 of sufficient diameter to provide for the removal of the rotating catalyst bed assembly 15. This end of the pressure vessel is provided with a closure member 16 secured to the pressure vessel by bolts 17, a gasket or packing 18 being provided to make a gas-tight pressure seal. The closure member 16 is provided with a central opening 19 and is constructed to provide a bearing 19' for driving shaft 20 of the rotating catalyst bed assembly, a packing gland 21 or equivalent structure being provided to permit rotation while maintaining a gas-tight pressure seal. Driving shaft 20 may be rotated at any desired speed by external driving means (not shown).

The rotating bed assembly consists of end member 22 secured to shaft 20, end member 23 rotatably mounted on inlet line 12 and provided with packing gland 24, annular foraminous catalyst supports 25 and 26 which are held in place by annular flanges on the end supports and tie rods 27. The annular filter supports 25 and 26 may be perforated steel cylinders or screen cylinders of required structural strength. The space between the cylindrical catalyst supports is filled with Synthol catalyst of any type known to the art. Such catalyst is usually of the cobalt type or the iron type, the cobalt type promoting the reaction $2xH_2 + xCO \rightarrow (CH_2)_x + xH_2O$ and the iron type catalyst promoting the reaction:

$$3xH_2 + 3xCO \rightarrow 2(CH_2)_x + xH_2O + xCO_2$$

In either case the catalyst should be of sufficiently large particle size as to be retained by members 25 and 26. Such catalysts are well known to those skilled in the art and a detailed description thereof is unnecessary.

Before the rotating catalyst bed assembly is bolted together distributor pipe 28 is secured to the end of pipe 12 with suitable marking on the protruding end of pipe 12 to indicate the position of the baffle or distributor 29 which is carried by the upturned end of distributor pipe 28. Pipe 12 is then keyed into opening 13 so that the distributor pipe 28 will be directed upwardly with baffle 29 in a substantially horizontal position. The outwardly extending end of pipe 10 is then coupled to extension 12' of the charge gas inlet line. When thus assembled rotation of shaft 20 will cause rotation of the annular catalyst bed 30 which is retained between supports 25 and 26, shaft 20 rotating in the bearing 19' and pipe 12 being keyed against rotation but serving as a support and an axis of rotation for end member 23.

The top of pressure vessel 10 is provided with a flanged opening 31 for the removal of Synthol product gases. On one side of the pressure vessel is a flanged opening 32 for introducing cooling liquid and at the other side thereof is a flanged opening 33 for removing cooling liquid. At the bottom of the pressure vessel is a flanged opening 34 for introducing or withdrawing cooling liquid, i. e. for raising or lowering the liquid level thereof in the pressure vessel. A gauge glass 35 or other suitable means is employed for indicating the liquid level in the pressure vessel.

Referring to Figure 3, a line 36 leads from flanged opening 33 to tubes or coils 37 in steam generator 38, water being introduced into the steam generator through 39 and steam being withdrawn therefrom through line 40. Liquid leaves coils or tubes 37 through line 41 and is returned by pump 42 through flanged opening 32 back to the pressure vessel. Under some conditions cooling coils or tubes may be placed directly in vessel 10 below the liquid level therein, thereby avoiding the necessity of an external circulation system. Liquid is initially introduced into the pressure vessel through flanged opening 34 from reservoir 43 by means of line 44 and pump 45. When the liquid has reached the desired level in the pressure vessel, pump 45 is stopped and circulation of the liquid by means of pump 42 is started, a heat exchanger being employed in the circuit during the starting-up period when necessary to bring the liquid to the desired conversion temperature. When these conditions have been established shaft 20 is rotated, preferably at about .5 to 5 revolutions per minute, i. e. at such speed as to permit the liquid to drain rapidly from the catalyst bed and leave a free path for gases therethrough but at the same time to insure that the catalyst particles are reimmersed before they become overheated.

Where the catalyst is mounted on a carrier of considerable heat capacity or is itself of large heat capacity the heat of reaction may be absorbed in such catalyst and carrier during the portion of the cycle when catalyst contacts reaction gases, and such heat may be abstracted from the catalyst and carrier during the portion of the cycle that the catalyst is immersed in liquid. Catalyst carriers may be particles of metallic iron or other metal, alumina, acid treated clays such as Super Filtrol, kieselguhr, pumice, or other known carrier material and the carrier may constitute as much as 80 to 99% of the total catalyst bed. When the catalyst bed is thus of sufficiently large heat capacity so that it can absorb the heat of reaction (thereby increasing its sensible heat) without exceeding safe temperature limits in its periods of exposure to reaction gases, the cooling liquid may be a relatively non-volatile liquid and may in this case be a wax solvent so that during periods of immersion the catalyst bed is not only cooled but is simultaneously reconditioned. Examples of such cooling liquids include diphenyl, diphenyl oxide, chlorex, furfural, alkyl aromatic hydrocarbons, ordinary hydrocarbons of the kerosene to lubricating oil boiling range, etc.

Preferred cooling liquids, however, are those which are vaporizable under conversion conditions such for example as water, gasoline boiling range hydrocarbons, and low boiling aqueous mixtures of the oxygen-containing products of the Synthol reaction itself. Such liquids wet the catalyst particles and absorb as heat of vaporization the heat liberated by the reaction so that there is no substantial temperature increase in the catalyst bed as the reaction proceeds. When relying solely on such heat of vaporization for obtaining temperature control, the catalyst particles should be wet with liquid from the time they emerge from the liquid until the time they are reimmersed. In some cases it may be desirable to augment the wetting of the catalyst particles by spraying additional cooling liquid thereon during the period when they are exposed to gases but in such operations the amount of sprayed liquids should be sufficient only to wet the catalyst particles and not appreciably to fill the voids between said particles or to interfere with gas or vapor flow through the bed.

Having established desired temperature conditions and having brought the reactor up to conversion pressure, a carbon monoxide-hydrogen gas charge (preferably with a hydrogen to carbon monoxide ratio of about 2:1 or greater) is introduced through line 12 and distributed inside the rotating bed assembly 15 above the liquid level by means of baffle or distributor 29. The gases necessarily pass through the exposed portion of the rotating catalyst bed and are converted in such passage into the desired synthesis products. These products leave the pressure vessel or conversion chamber through flanged outlet 31 and line 46 and cooler 47 to separator 48 from which condensed aqueous liquids may be returned to reservoir 43 through line 49 and condensed hydrocarbons removed through line 49'. The remaining synthesis products and condensed hydrocarbons may be passed by line 50 to conventional fractionation and recovery means (not shown). When the cooling is effected by vaporizing liquid from the rotating catalyst bed, the vaporized liquid will of course leave the reactor with Synthol products. When such liquid is water or a low boiling fraction of the Synthol product itself it may be unnecessary to employ steam generator 38 and the circuit connected therewith. However, when the liberated heat of reaction simply increases the sensible heat of the catalyst bed and this heat is then transferred to the liquid, the heat thus picked up by the liquid may be removed therefrom by continuously passing a portion of the liquid through the steam generator via lines 36 and 41 by means of pump 42. Even when readily vaporizable liquid is employed a considerable amount of the heat may be removed therefrom by use of the steam generator or equivalent circuit.

An important process variable in the Synthol reaction as well as other catalytic reactions is the space velocity or in other words the rate at which charging stock gases or vapors are passed over the catalyst. In Synthol reactions and in many other catalytic reactions, space velocities may desirably vary over a considerable range. Optimum space velocity varies with activity of the catalyst and many other variables and it is desirable to provide an expeditious method of controlling space velocity without altering the charging gas rate. My invention provides a remarkably effective method for accomplishing this result. By simply pumping more liquid from reservoir 43 to the reactor chamber by means of pump 45 the liquid level can be increased until it approaches the upturned end of distributor pipe 28. The amount of catalyst then exposed would be very small and the space velocity would be very high. In order to obtain lower space velocities it is only necessary to lower the liquid level in the reaction chamber which can be accomplished by opening by-pass valve 51 and closing valve 52. As the liquid level is lowered more and more effective catalyst area is exposed so that with a constant charge gas rate the space velocity becomes lower and lower. The gauge glass or liquid level indicator may in fact be calibrated to indicate directly the space velocity under given charge rate and pressure conditions and both valve 41 and pump 55 may be manually or automatically regulated in accordance with the liquid level in the reactor for maintaining any desired constant space velocity or any desired change in space velocity.

It will be understood of course that suitable provision may be made in cooling circuit 36—41 to remove any catalyst particles that might escape through retainers 25 and 26 and to remove by fractionation or by use of selective solvents any waxy materials or other substances which might tend to accumulate in the liquid during continuous operation. Similarly it should be understood that condenser 47 and separator 48 is a schematic representation of any cooling and fractionation means which may be employed for recovering the desired liquid fraction for use as a coolant in the reactor.

With cobalt type catalysts the system may operate at a pressure of the order of about 1 to 10 atmospheres, e. g. about 3 atmospheres, at a temperature of the order of about 300 to 450° F., e. g. about 400° F. and at space velocities in the approximate range of 50 to 1500, e. g. about 400 cubic feet of gas charged (measured at 60° F. and atmospheric pressure) per hour per volume of exposed catalyst. With iron type catalyst the conversion pressure may be about 100 to 500 pounds per square inch, the conversion temperature about 500° F. to 700° F., e. g. about 600° F. and a space velocity in the approximate range of 1000 to 10,000, e. g. about 5000 cubic feet of gas charged (measured at 60° F. and atmospheric pressure) per hour per volume of exposed catalyst. The liquid employed is preferably one whose boiling point is not substantially lower than the desired conversion temperature under the conversion pressure conditions, a liquid boiling in the general vicinity of conversion temperature being advantageous where heat of reaction is to supply heat of vaporization of the coolant liquid. Much higher boiling liquids, however, may be employed when vaporization is not primarily relied upon for temperature control.

While my invention has been described in connection with a Synthol process it may likewise be applied to other catalytic conversion processes and it is particularly applicable to those processes which present problems of temperature and space velocity control. Where reactions are highly endothermic instead of exothermic, heat may be supplied to the catalyst bed by immersion in a liquid which is externally or internally heated instead of cooled. The charge gases or vapors may be introduced directly into the reaction chamber and reaction products removed from the inside of the rotating bed. When a liquid coolant is employed in which waxy catalyst deposits are not soluble or in fact in any operations, the liquid may be drained from the reactor at intervals and replaced by a liquid which will dissolve undesirable components from the catalyst or otherwise recondition, reactivate, or revivify the catalyst for reuse. Many other modifications of structural arrangement and alternative operating methods and conditions will be apparent from the above description to those skilled in the art.

I claim:

1. In a catalytic conversion process wherein contaminants are deposited on the catalyst during the conversion which contaminants are soluble in a liquid which method comprises rotating an annular catalyst bed while maintaining said bed partially immersed in a liquid which is inert with respect to said catalyst but which is a solvent for said contaminants so that a substantial portion of the catalyst bed is alternately immersed in and removed from said liquid, passing charging stock gases through the unimmersed portion of the catalyst bed under conversion conditions whereby contaminants are deposited on said catalyst and removing such deposits from said catalyst by immersion in said liquid.

2. The method of effecting reaction between carbon monoxide and hydrogen by means of a synthesis catalyst which method comprises rotating an annular bed of synthesis catalyst in a conversion zone, maintaining said bed partially immersed in a liquid which is inert with respect to said catalyst and at least partially vaporizable under conversion condition, continuously passing the carbon monoxide-hydrogen gas mixture through the unimmersed portion of said bed under conversion conditions and rotating said bed at a sufficient rate to prevent overheating of the catalyst therein.

3. The method of claim 2 wherein the liquid is readily vaporizable under conversion conditions which includes the further steps of withdrawing vaporized liquid with conversion products from the conversion zone, separating liquid from said conversion products and returning said liquid to said conversion zone.

4. The method of claim 2 which includes the further steps of indirectly contacting said liquid with a heat exchange medium whereby heat absorbed by the catalyst bed in the conversion step is transferred to said liquid and is thence transferred to said heat exchange medium.

5. The method of claim 2 which includes the further step of controlling space velocity by regulating the extent to which said rotating annular catalyst bed is immersed in said liquid.

6. The method of effecting exothermic catalytic conversion of hydrogen and carbon monoxide under controlled temperature conditions which method comprises continuously rotating an annular bed of synthesis catalyst partially immersed in a bath of inert liquid which wets said catalyst and is at least partially vaporizable under conversion conditions so that a substantial portion of the catalyst bed is alternately immersed in and removed from said liquid, continuously passing a gasiform charge comprising hydrogen and carbon monoxide through the unimmersed portion of the annular catalyst bed under conversion conditions while the immersed portion of said bed is sealed by said liquid against the passage of gasiform charge therethrough, rotating said annular bed at a rate to permit partial vaporization of liquid from the unimmersed portion of the catalyst bed but to prevent complete vaporization of liquid therefrom whereby the vaporization of liquid from the unimmersed portion of the catalyst bed tends to maintain said unimmersed portion at substantially uniform temperature, and cooling the liquid in said bath to maintain it at substantially constant temperature.

7. The method of claim 6 which includes the step of regulating the space velocity at which the gasiform charge contacts catalyst material by controlling the extent to which said rotating catalyst bed is immersed in said liquid.

8. The method of effecting an exothermic reaction of components of a gaseous stream by means of a solid catalyst which method comprises rotating a permeable annular bed of solid catalyst on a substantially horizontal axis in a conversion zone, maintaining said bed partially immersed in a cooling liquid, continuously passing the gaseous stream through the unimmersed portion of said bed under conversion conditions, continuously abstracting heat from the cooling liquid and rotating said bed at a sufficient rate to prevent overheating of the catalyst therein.

9. The method of effecting reaction between carbon monoxide and hydrogen by means of a solid synthesis catalyst which method comprises rotating a permeable annular bed of synthesis catalyst on a substantially horizontal axis in a conversion zone, maintaining said bed partially immersed in a cooling liquid, continuously passing the carbon monoxide-hydrogen gas mixture through the unimmersed portion of said bed under conversion conditions, continuously abstracting heat from the cooling liquid and rotating said bed at a sufficient rate to prevent overheating of the catalyst therein.

10. The method of effecting an exothermic reaction of components of a gaseous stream in a reaction zone in the presence of a solid catalyst which comprises rotating a permeable annular bed of solid catalyst within the reaction zone about a substantially horizontal axis, maintaining said bed partially immersed in a cooling liquid, and continuously passing the gaseous stream under conversion conditions through the unimmersed portion of said bed.

11. The method of claim 10 wherein the cooling liquid is readily vaporizable under conversion conditions which includes the further steps of withdrawing vaporized liquid with conversion products from the conversion zone, separating liquid from said conversion products and returning said liquid to said conversion zone.

12. The method of claim 10 which includes the further steps of indirectly contacting said liquid with a heat exchange medium whereby heat absorbed by the catalyst bed in the conversion step is transferred to said liquid and is thence transferred to said heat exchange medium.

13. The method of claim 10 which includes the step of regulating the space velocity at which the gaseous stream contacts catalyst material by controlling the extent to which the rotating bed of solid catalyst is immersed in the liquid.

ROBERT J. HENGSTEBECK.

REFERENCES CITED

The following references are of record in the file of this patent:

UNITED STATES PATENTS

| Number | Name | Date |
|---|---|---|
| 1,004,035 | Kayser | Sept. 26, 1911 |
| 1,008,474 | Kayser | Nov. 14, 1911 |
| 1,113,151 | Chisholm | Oct. 6, 1914 |
| 1,484,745 | Wadsworth | Feb. 26, 1924 |
| 1,828,734 | Dormon | Oct. 27, 1931 |
| 1,836,325 | James | Dec. 15, 1931 |
| 1,899,504 | Hanson | Feb. 28, 1933 |
| 2,062,413 | Grady | Dec. 1, 1936 |
| 2,079,935 | Frey | May 11, 1937 |
| 2,268,535 | Schutte | Dec. 30, 1941 |

FOREIGN PATENTS

| Number | Country | Date |
|---|---|---|
| 257,825 | Germany | Mar. 22, 1913 |